United States Patent [19]

Lin et al.

[11] Patent Number: 4,517,503

[45] Date of Patent: May 14, 1985

[54] METHOD AND APPARATUS FOR NORMALIZING THE SPEED OF AN ELEMENT POSITIONABLE BY A SERVOMECHANISM

[75] Inventors: Frank W. Lin; Suhdok D. Moon, both of Los Altos; Tri S. Van, Union City; Max I. Anzai, Belmont, all of Calif.

[73] Assignee: Mechatron Systems, Inc., Sunnyvale, Calif.

[21] Appl. No.: 536,915

[22] Filed: Sep. 27, 1983

[51] Int. Cl.³ ............................................. G05B 13/00
[52] U.S. Cl. .................................... 318/561; 318/632; 318/617; 364/519; 400/279
[58] Field of Search ................ 318/561, 632, 615–618; 364/148, 167, 176, 519; 400/279

[56] References Cited

U.S. PATENT DOCUMENTS

| 3,954,163 | 5/1976 | Gabor | 318/618 |
|---|---|---|---|
| 4,355,273 | 10/1982 | DuVall | 318/561 |
| 4,455,518 | 6/1984 | Drehobl | 318/632 |
| 4,459,525 | 7/1984 | Hasegawa | 318/618 X |
| 4,460,968 | 7/1984 | Cavill et al. | 318/632 X |

*Primary Examiner*—B. Dobeck
*Attorney, Agent, or Firm*—Townsend and Townsend

[57] ABSTRACT

A speed normalization circuit for eliminating the need to fine tune a servomechanism, such as a daisy wheel printer, after manufacture, for example, in order to compensate for speed variations caused by tolerance variations throughout the manufacturing process and evidenced by variations in the actual print wheel speed and the actual carriage speed, is disclosed. In operation, when a restore sequence is called for (power up, remote restore, cover open/resume, check/resume), the carriage is restored to the leftmost home position and is then stepped three times by an identical amount (twelve increments, 1/120 of an inch per increment). The average value of the actual carriage speed for these three movements is determined and a compensation value is selected. If the carriage speed is too slow, the nominal speed value stored in a read only memory look-up table is incremented by a fixed value (i.e., plus one, two, or three units); if the speed is too fast, the nominal speed value is decremented by a fixed value (i.e., minus one, two, or three units). The compensation value is added to the nominal speed value during subsequent actual operation of the servomechanism. For the print wheel, there are two programmed movements upon restore, namely, one half rotation in each direction (one forward, one reverse) for a total of ninety-six increments per movement. The speed compensation value is calculated in the same manner. Other features are also disclosed.

24 Claims, 11 Drawing Figures

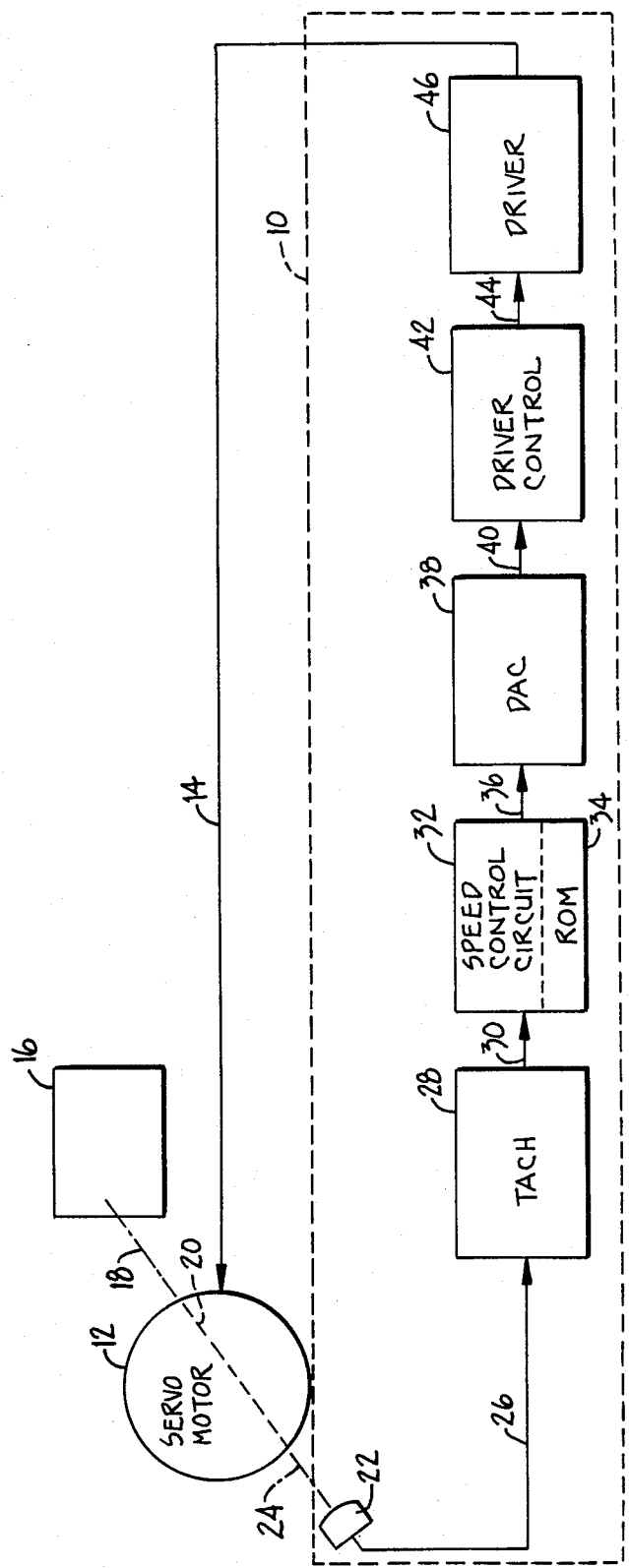
FIG._1.

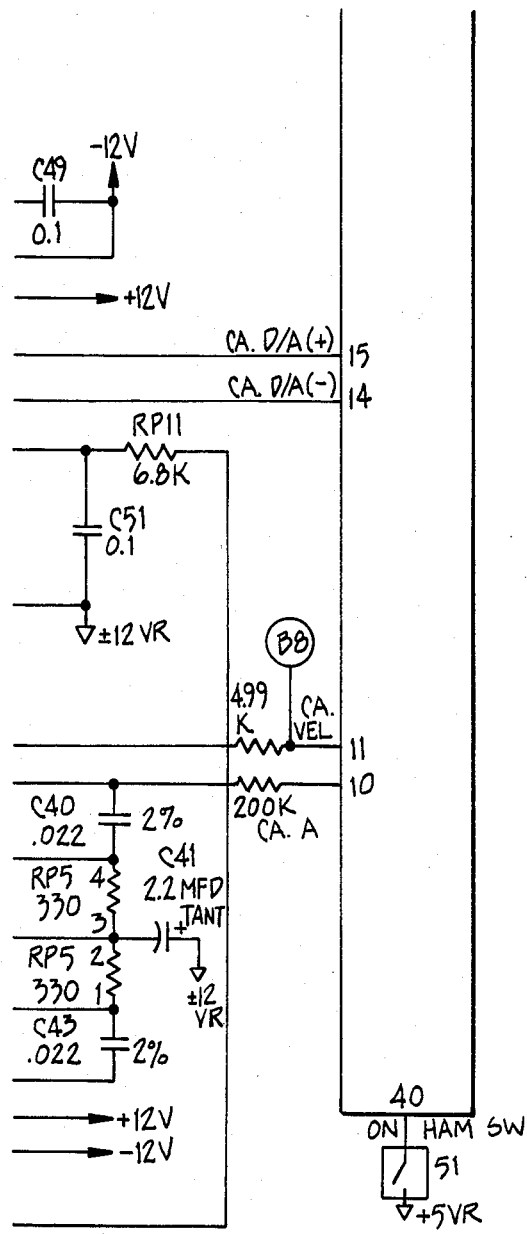
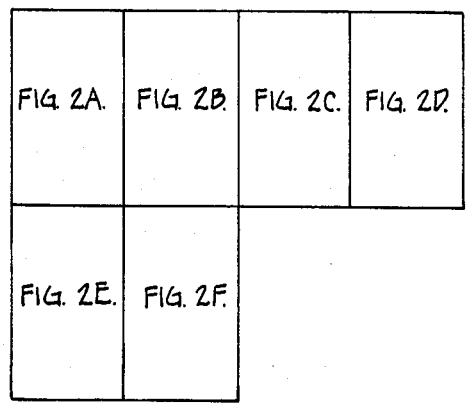
FIG._2F.
FIG._2.

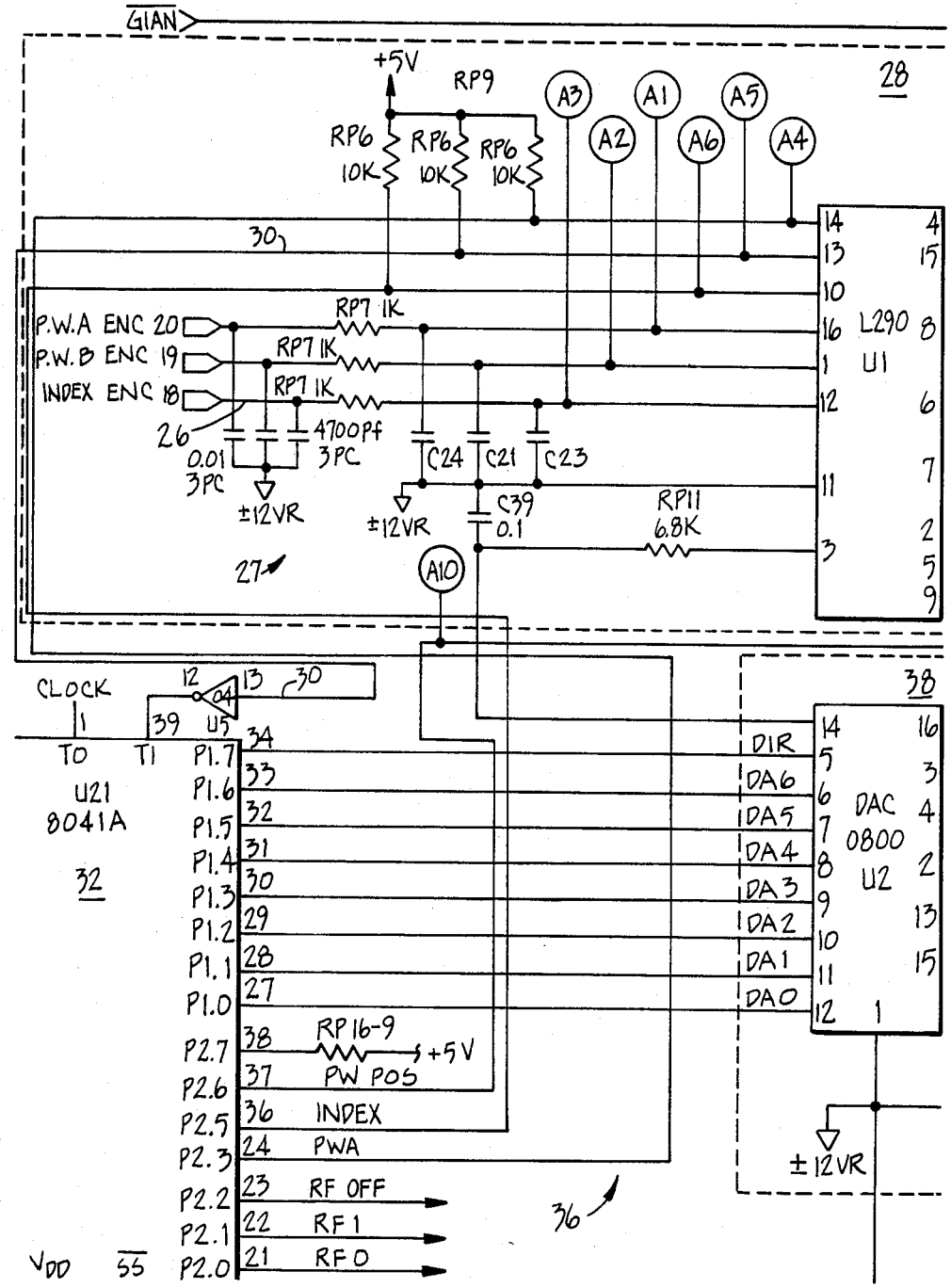
FIG._2A.

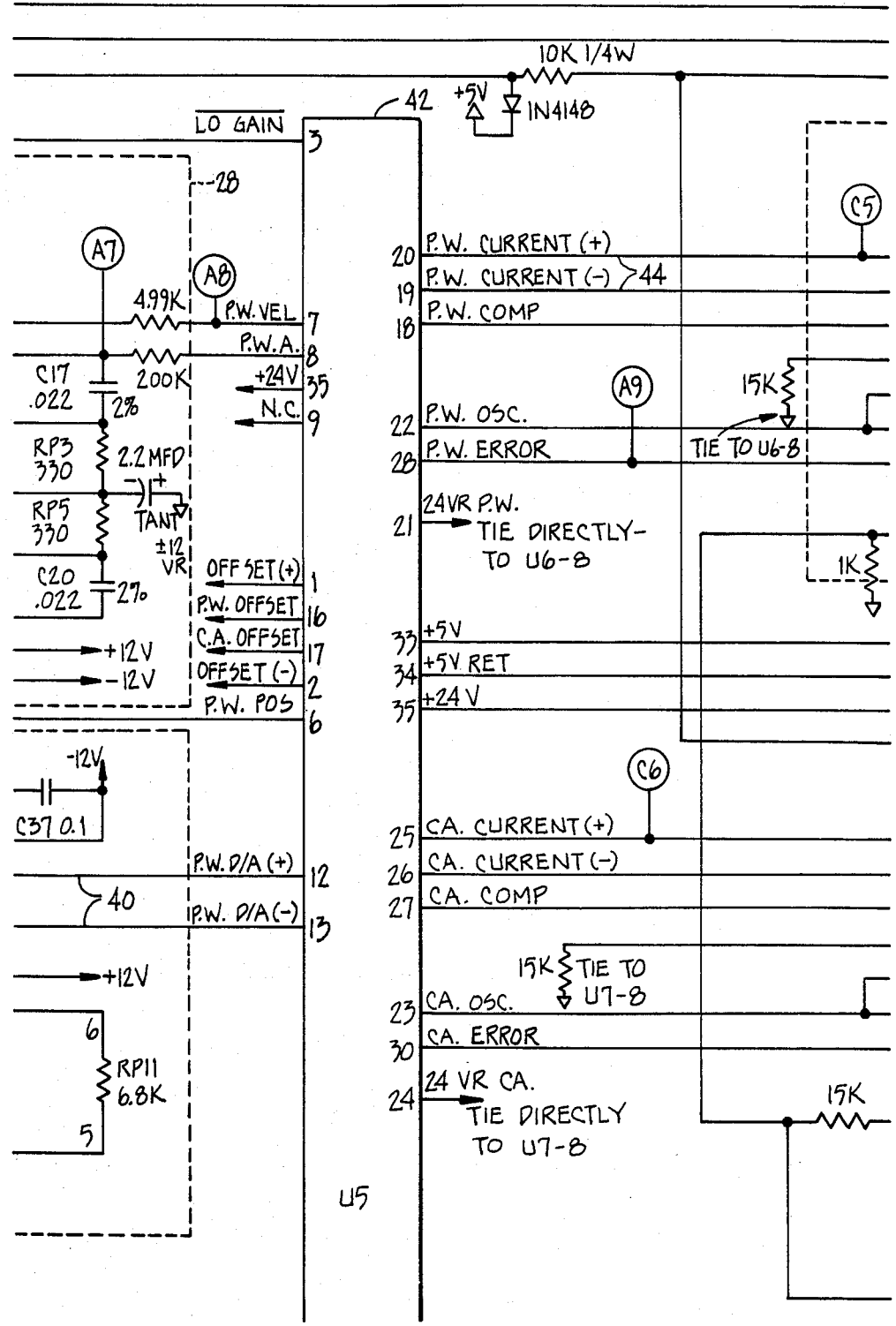
FIG._2B.

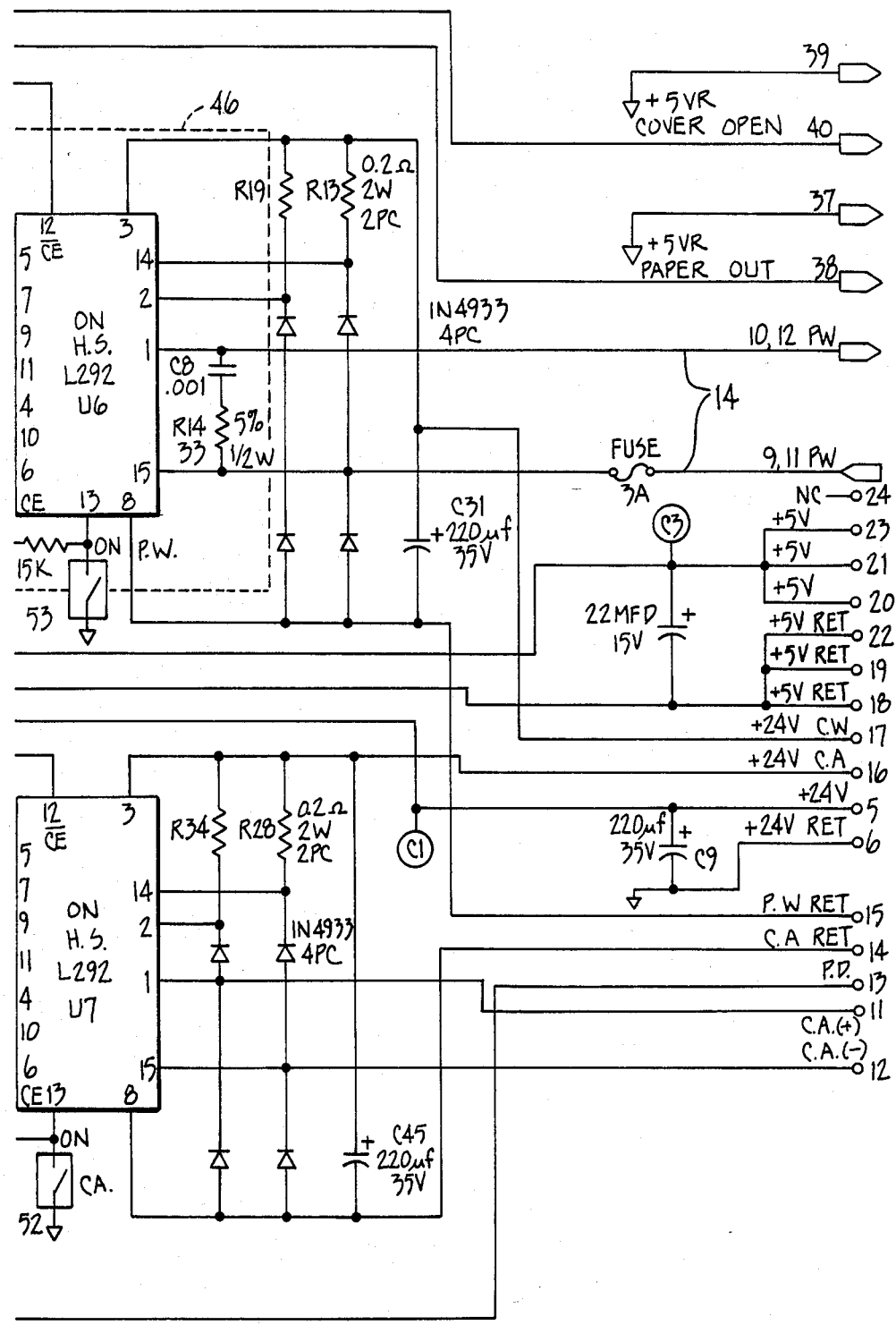
FIG._2C.

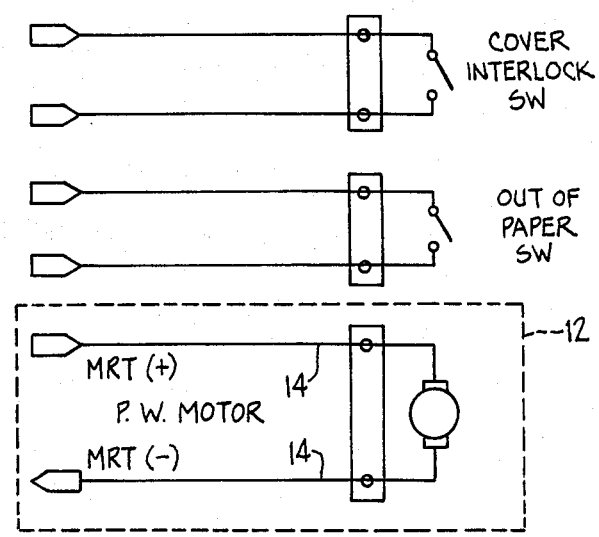
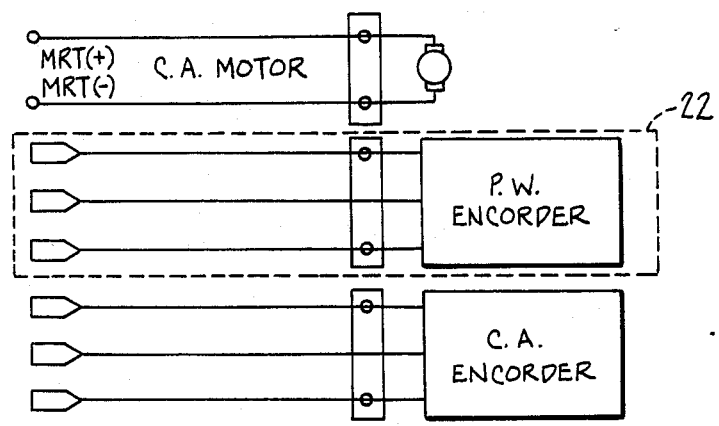
FIG._2D.

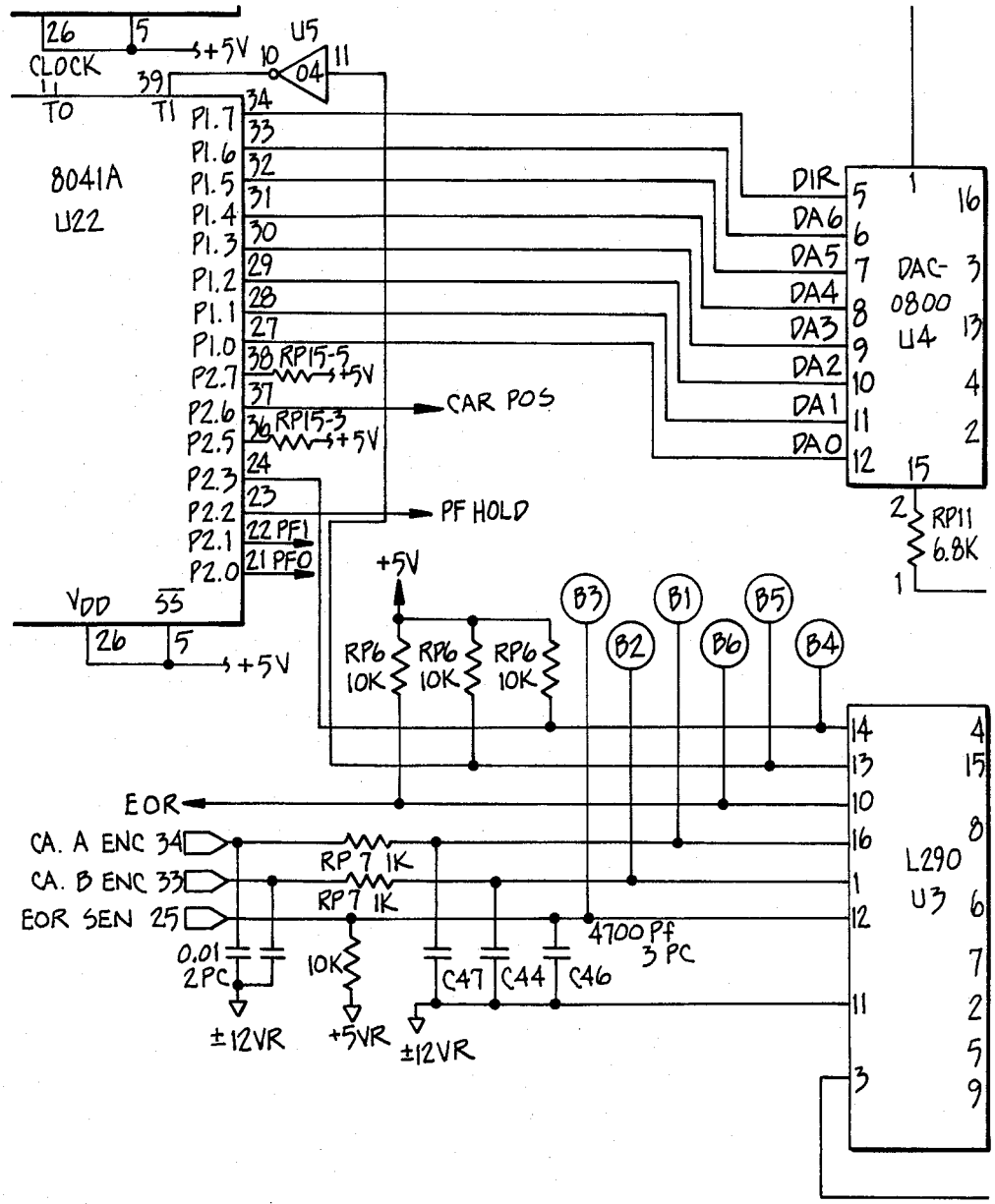
FIG._2E.

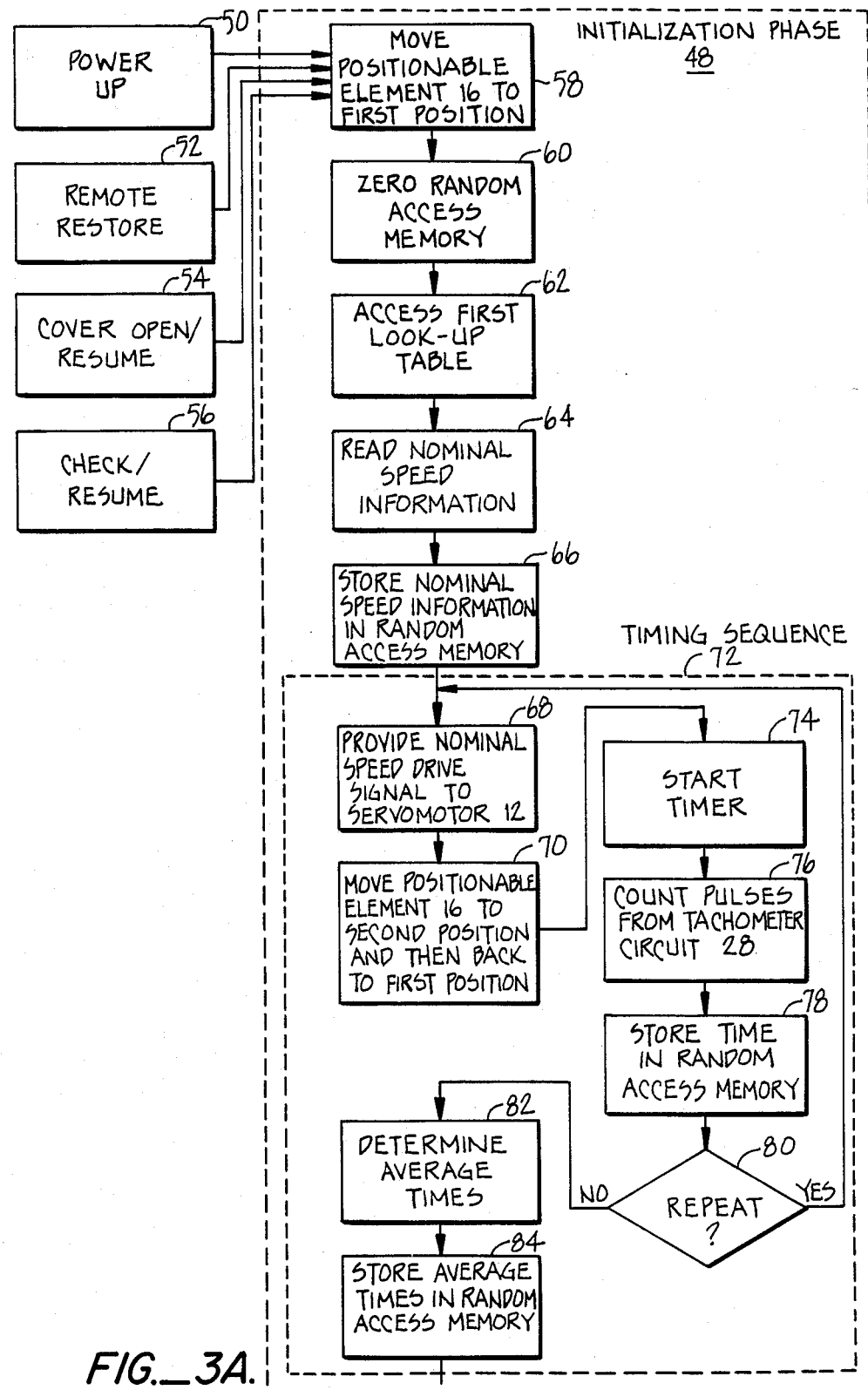
FIG._3A.

METHOD AND APPARATUS FOR NORMALIZING THE SPEED OF AN ELEMENT POSITIONABLE BY A SERVOMECHANISM

BACKGROUND OF THE INVENTION

This invention relates to automated positioning systems and, more particularly, to automatic positioning servomechanisms responsive to a command signal for controllably moving a positionable element to one of various positions with negative feedback for maintaining the position until another command signal is provided. Specifically, the invention is directed to a method and apparatus for normalizing the velocity or speed at which the positionable element is moved by the servomechanism for attaining increased speed consistency and positional precision, especially in equipment characterized by a high frequency of position changes, such as printers, for example, daisy wheel printers, disk drives, and other equipment used in information processing.

By way of example, the invention will be described in connection with printers, namely, daisy wheel printers, in order to facilitate an understanding of the invention. The exemplary use of the invention in connection with a daisy wheel printer, however, is by way of illustration only and is not to be construed as a limitation of the principles of the invention to daisy wheel printers or to printers generally. As will become clear, the principles which underlie the invention have application to all automatic positioning servomechanisms for improving the precision with which a movable element is positioned by the servomechanism, especially under circumstances where the positionable element is indexed rapidly among positions.

Focusing on daisy wheel printers, a petal shaped print wheel is rotatably mounted to a carriage. The carriage is reciprocally mounted with respect to a paper feeder such that the reciprocal movement of the carriage is orthogonal with respect to the direction of paper feed, for example, the paper is fed vertically and the carriage is moved horizontally. Relative movement of the paper, the carriage, and the print wheel, and actuation of the print wheel, enables lines of characters to be printed. Printing requires that the paper be indexed to a line position, the carriage be moved to a character position, and the print wheel be rotated to a character, whereupon a hammer strikes the wheel causing the wheel to strike a ribbon interposed between the wheel and the paper, thereby imprinting a character on the paper.

The print wheel and the carriage are moved to the appropriate positions by respective servomechanisms. In the case of the print wheel, the servomechanism is under the control of a host which selects the characters to be printed. Desirably, the print wheel is rotatable in both a forward and a reverse direction in order to optimize the speed with which the character is advanced into position for printing, thereby increasing the throughput of the printer. Similarly, the order in which the characters are printed is determined by the host by control of the carriage position. Desirably, the carriage is also movable in a forward and a reverse direction to a character position in order to optimize throughput.

In the case of both the print wheel and the carriage, it is desirable that the forward and reverse speed, that is, the magnitude of the velocity, which is direction independent, be the same or at least within a predetermined tolerance and that the speed in both directions be within a certain range of a normalized speed. The normalized or nominal speed is the specified speed at which the printer is configured to operate and is dependent upon such factors as the physical dimensions and weight of the print wheel and carriage and the gain of the servomechanisms included in the printer, as well as factors determined by the host, such as space between characters. Importantly, and a long extant problem to which the invention is addressed, is that if the speeds of the respective print wheel and carriage do not satisfy this criterion, the quality of the print suffers. That is, if there is a disparity between the specified and actual speeds, positioning is imprecise, which results in poor registration of characters with respect to a line on the paper, only a portion of the character being printed, and other unacceptable deviant print characteristics.

Various factors cause the actual speed of the print wheel, as well as the carriage, to vary from the specified speed during movement. Several of the factors are inherent, such as tolerance variations throughout the manufacturing process in the production of the print wheel and carriage and other mechanical elements, as well as the electrical elements. Other factors are attributable to the environment in which the printer is deployed, such as dusty or dirty surroundings or installations in which the ambient temperature experiences seasonal changes such that the temperature during one day of operation is different from the temperature during another day of operation. These factors necessitate factory adjustment at the time of manufacture and/or precipitate periodic service calls when print quality deteriorates or the printer malfunctions.

In the past, the control circuit for the servomechanism has included at least one potentiometer which is adjusted for providing compensation in order to normalize the speed to the speed specified for the daisy wheel printer. An extender card is required in order to provide access to test points. An oscilloscope is viewed while the potentiometer is operated for monitoring the time for movement from one position to another so that the speed of movement results in proper positioning of the print wheel and carriage for printing in synchronism with the command signal from the host (i.e., the timing of the printing is synchronized).

The known manual adjustment using potentiometers has several disadvantages. Firstly, precision potentiometers are expensive. In addition, manual adjustments are difficult to perform and therefore require a skilled technician. Moreover, manual adjustments consume a significant amount of time and, therefore, are expensive. An initial adjustment at the factory is required, and frequent service calls are not unusual. Furthermore, if any parts of the printer are repaired or replaced or if circuit boards need to be interchanged, the need for adjustment is probable, which compounds the expense of repair or maintenance of the printer.

The invention provides automatic speed adjustment or compensation without the use of expensive precision potentiometers, an extender card, and an oscilloscope. The method and apparatus in accordance with the invention eliminate the need to fine tune a daisy wheel printer after manufacture for the purpose of adjusting for speed variations caused by tolerance variations throughout the manufacturing process and evidenced by differences in both the print wheel speed and the carriage speed, as well as differences in the speeds of the print wheel and carriage attributable to changes in environmental conditions. Moreover, the invention provides interchangeability of modular circuit boards among printers. Not only is factory adjustment eliminated, but frequent service calls are avoided. Furthermore, the average print quality between scheduled service calls for preventive maintenance is statistically improved; that is, the likelihood that print quality will deteriorate over the period between routinely scheduled service calls is substantially diminished.

SUMMARY OF THE INVENTION

The invention provides a method and apparatus for conforming the actual speed of a positionable element included in a positioning servomechanism, such as the print wheel and/or carriage in a daisy wheel printer, to the speed specified for operation. In accordance with the invention, speed normalization is preferably performed automatically when the means for moving the positionable element is activated. The method and apparatus of the invention are characterized in that the adjustment is performed prior to (i.e., not continually during) actual operation of the means for moving the positionable element. Consequently, normalization is performed asynchronously with respect to actual operation and, therefore, does not affect (i.e., decrease) throughput.

In accordance with the method aspect of the invention, a method for adjusting the operating speed of a positional element movable among various positions is provided, comprising the steps of: providing stored information correlated to a preselected nominal speed of movement for the positionable element during operation; providing stored information correlated to at least one speed compensation value; activating means for moving the positionable element; applying a predetermined drive signal to the moving means for moving the positionable element from a first position to a second position in response to activation of the moving means, the predetermined drive signal being dependent upon the stored information correlated to the preselected nominal speed; detecting the actual speed of the positionable element during movement from the first position to the second position in response to application of the predetermined drive signal to the moving means; converting the detected actual speed of the positionable element during movement from the first position to the second position to information correlated to the actual speed of the positionable element during movement from the first position to the second position; selecting information correlated to a speed compensation value dependent upon the information correlated to the actual speed of the positionable element during movement from the first position to the second position; storing the selected information correlated to the speed compensation value; and determining a compensated drive signal from the stored information correlated to the preselected nominal speed and the stored information correlated to the speed compensation value. Preferably, the step of providing stored information correlated to a preselected nominal speed of movement for the positionable element during operation and the step of providing stored information correlated to at least one speed compensation value comprise providing respective storage means having stored information correlated to a preselected nominal speed and stored information correlated to at least one speed compensation value.

In accordance with the apparatus aspect of the invention, apparatus for adjusting the operating speed of a positionable element movable among various positions is provided, comprising: means for storing information correlated to a preselected nominal speed of movement for the positionable element during operation; means for storing information correlated to at least one speed compensation value; means for moving the positionable element; means for applying a predetermined drive signal to the moving means for moving the positionable element from a first position to a second position in response to activation of the moving means, the predetermined drive signal being dependent upon the stored information correlated to the preselected nominal speed; means for detecting the actual speed of the positionable element during movement from the first position to the second position in response to application of the predetermined drive signal to the moving means; means for converting the detected actual speed of the positionable element during movement from the first position to the second position to information correlated to the actual speed of the positionable element during movement from the first position to the second position; means for selecting information correlated to a speed compensation value dependent upon the information correlated to the actual speed of the positionable element during movement from the first position to the second position; means for storing the selected information correlated to the speed compensation value; and means for determining a compensated drive signal from the stored information correlated to the preselected nominal speed and the stored information correlated to the speed compensation value. Preferably, the means for storing the information correlated to a preselected nominal speed of movement for the positionable element during operation and the means for storing information correlated to at least one speed compensation value comprise respective look-up tables stored in a read only memory.

The method and apparatus in accordance with the invention provide an adjustment in the speed of operation of the servomechanism which propels the positionable element between positions so that the positions required to be assumed by the positionable element are occupied as desired during actual operation. The adjustment is performed automatically upon activation of the servomechanism and does not require any external operator intervention by way of manually entered adjustments. Moreover, the operator need not analyze any output in order to ascertain whether any adjustments are required, since the adjustments are performed internally. Consequently, the speed adjustment method and apparatus in accordance with the invention eliminate human error in the adjustment and provide cost effective speed compensation without interference with actual operation of the servomechanism.

BRIEF DESCRIPTION OF THE DRAWINGS

The above and other features of the invention and the concomitant advantages will be better understood and appreciated by those skilled in the art in view of the description of the preferred embodiments given below in conjunction with the accompanying drawings. In the drawings:

FIG. 1 is a block diagram of an embodiment of a circuit in accordance with the invention for normalizing the speed of a servomechanism which moves a positionable element;

FIG. 2, comprising FIGS. 2A through 2F, is a schematic circuit drawing for a preferred implementation of the circuit shown in FIG. 1; and FIG. 3, comprising

DESCRIPTION OF THE PREFERRED EMBODIMENTS

Figures 3A, 3B:
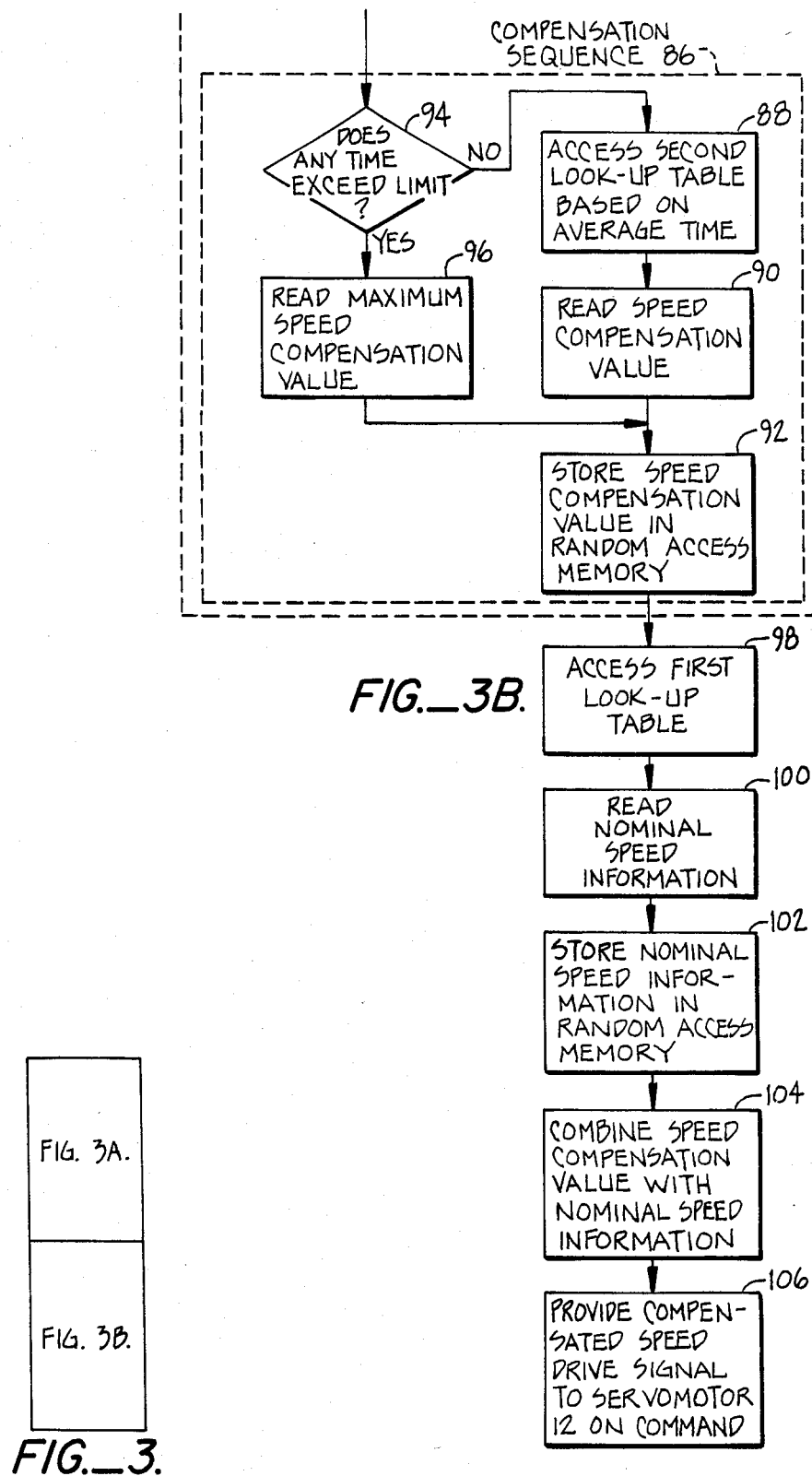
FIGS. 3A and 3B, is a flow chart of the method in accordance with the invention for normalizing the speed of a servomechanism which moves a positionable element.

In accordance with the invention, a method and apparatus are provided for normalizing the speed of a servomechanism which controls the movement of a positionable element. By way of example, an embodiment of the speed normalization circuit in accordance with the invention, generally indicated by the numeral 10 in FIG. 1, is incorporated into the control circuit for a servomotor 12 which is provided a drive signal on leads 14. The servomotor 12 in turn, again by way of example, moves a positionable element 16 in the form of a printing means, such as a print wheel or carriage of a daisy wheel printer, via a mechanical link 18 connected to the drive shaft 20 of the servomotor 12.

The actual speed of the positionable element 16 can be detected by any known technique. Preferably, as shown in FIG. 1, a shaft encoder 22 included in the speed normalization circuit 10 is connected via a mechanical link 24 to the drive shaft 20 of the servomotor 12. The shaft encoder 22 encodes the angular position of the drive shaft 20, which is correlated to the actual position of the positionable element 16. Movement of the positionable element 16 is evidenced by variations in the output signal produced by the shaft encoder 22.

The output of the shaft encoder 22 is connected by leads 26 to wave shaping circuitry included in a tachometer circuit 28. The tachometer circuit 28 is responsive to the output signal from the shaft encoder 22 indicative of movement of the positionable element 16 between positions. The tachometer circuit 28 in turn produces an output signal in the form of a pulse train whose frequency is a function of the rate at which the output signal from the shaft encoder 22 is varying which is correlated to the movement of the positionable element 16. The tachometer circuit 28 also includes circuitry which discriminates between output signals from the shaft encoder 22 indicative of actual changes in position of the positionable element 16 and spurious noise. The output signal from the tachometer circuit 28 is in the form of a pulse train which is preferably compatible with commercially available integrated circuits, such as microprocessors.

The output of the tachometer circuit 28 is connected by a lead 30 to the input of a speed control circuit 32 included in the speed normalization circuit 10. During an initialization phase, the speed control circuit 32 is responsive to the pulse train produced by the tachometer circuit 28 for effecting compensation of the movement of the positionable element 16 so that the speed of movement of the positionable element conforms to the speed specified for operation of the positionable element. During the initialization phase, the speed control circuit 32 functions in accordance with instructions contained in a program read only memory (ROM) 34 for causing a nominal speed drive signal correlated to the specified speed for the positionable element 16 during actual operation to be provided to the servomotor 12. During actual operation, the speed control circuit 32 determines a compensated speed drive signal for causing the servomotor 12 to move the positionable element 16 at a speed normalized to the specified speed for the positionable element. The details of operation by which the speed control circuit 32 determines the drive signals provided to the servomotor 12 will be described later.

The output of the speed control circuit 32 is connected by a bus 36 to the input of a digital-to-analog converter (DAC) 38 included in the speed normalization circuit 10. The DAC 38 converts the digitally encoded representation of the drive signal which appears at the output of the speed control circuit 32 into an analog drive signal.

The output of the DAC 38 is preferably connected by leads 40 to the input of a driver control circuit 42 included in the speed normalization circuit 10. The driver control circuit 42 increases the gain of the analog drive signal which appears at the output of the DAC 38.

The output of the driver control circuit 42 is connected by leads 44 to the input of a servomotor drive circuit 46 included in the speed normalization circuit 10. The servomotor drive circuit 46 is responsive to the analog drive signal that appears at the output of the driver control circuit 42 and provides a servomotor drive signal on the leads 14 which connect the output of the servomotor drive circuit to the input of the servomotor 12. The drive signal which is provided is dependent upon the drive signal determined by the speed control circuit 32 which, as indicated above, is a nominal speed drive signal during the initialization phase and a compensated speed drive signal during actual operation as will be described shortly.

FIG. 2 illustrates a preferred implementation of the speed normalization circuit 10 shown in FIG. 1. The detailed implementation is directed to a speed normalization circuit 10 for a daisy wheel printer having both a print wheel and a carriage. Since the speed normalization circuit 10 for the carriage is identical to the speed normalization circuit for the print wheel, only the print wheel speed normalization circuit will be described in detail.

As shown in FIG. 2, the servomotor 12 (FIG. 2D) for the print wheel receives a drive signal over the leads 14 (FIGS. 2C and 2D). The output of the shaft encoder 22 (FIG. 2D) for the print wheel is connected by the leads 26 (FIG. 2A) and filter circuitry 27 to the wave shaping circuitry included in the tachometer circuit 28. The tachometer circuit 28 is preferably a type L290 integrated circuit available from SGS Semiconductor Corporation of Santa Clara, Calif. The output signal produced by the tachometer circuit 28 comprises a pulse train whose frequency is correlated to the rate of change of angular position of the drive shaft 20 of the servomotor 12 (FIG. 2D).

The pulse train from the tachometer circuit 28 is connected by the lead 30 (FIG. 2A) to the input of the speed control circuit 32. The speed control circuit 32 is preferably a type 8041A or 8031 microprocessor manufactured by Intel Corporation of Santa Clara, Calif. The digitally encoded representation of the drive signal which appears on the bus 36 forms the output of the speed control circuit 32. The digitally encoded drive signal preferably comprises an eight-bit word having a most significant bit for controlling the polarity of the drive signal provided to the servomotor 12 (FIG. 2D) and seven remaining bits for determining the magnitude of the drive signal. The speed control circuit 32 (FIG. 2A) also provides a drive enable signal on another line included in the bus 36.

The output of the speed control circuit 32 is connected by the bus 36 to the input of the DAC 38. The DAC 38 preferably comprises a type 0800 integrated circuit manufactured by Signetics Corporation of Sunnyvale, Calif. The DAC 38 converts the eight-bit digitally encoded representation of the drive signal which appears on the bus 36 to an analog voltage.

The output of the DAC 38 is connected by the leads 40 (FIG. 2B) to the driver control circuit 42 which can modify the power characteristics of the analog signal from the DAC 38. The driver control circuit 42 routes the analog signal via the leads 44 to the servomotor drive circuit 46 (FIG. 2C). The servomotor drive circuit 46 is preferably a type L292 integrated circuit available from SGS. The output of the servomotor drive circuit 46 comprises the drive signal provided to the servomotor 12 (FIG. 2D) for positioning the print wheel of the daisy wheel printer.

Generally, referring again to FIG. 1, the speed normalization performed by the speed control circuit 32 is based on a speed compensation value, the need for which is determined during the initialization phase. The need for speed compensation is evident if there is a disparity between the specified speed of movement, that is, design speed, for the positionable element 16 and the actual operational speed of the positionable element.

With regard to operation, as shown in FIG. 3, the initialization phase indicated by the numeral 48, during which any need for speed adjustment or compensation is determined, can commence in response to any of various conditions, for example, energizing the servomotor 12. In the case of the embodiment where the positionable element 16 is a printing means, such as a print wheel or carriage, the initialization phase 48 commences when a restore sequence is called for in response to power up as indicated by the numeral 50 shown in FIG. 3A; remote restore (i.e., a host applies a remote reset signal) as indicated by the numeral 52 shown in FIG. 3A; cover open/resume (i.e., an interlock switch is connected in the power line for effecting power down when the cover is in the open position, and a resume switch is manually actuated after the cover is closed) as indicated by the numeral 54 shown in FIG. 3A; or check/resume (i.e., the print wheel or carriage is jammed, and a resume switch is manually actuated after the jam is cleared) as indicated by the numeral 56 shown in FIG. 3A. Upon commencement of the initialization phase 48, the positionable element 16 is moved to a first or home position as indicated by the numeral 58 shown in FIG. 3A. If the positionable element 16 is a print wheel, the print wheel is rotated to a home position. If the positionable element 16 is a carriage, the carriage is restored to the leftmost home position. The random access memory included in the speed control circuit 32 is initialized at 0 upon the commencement of the initialization phase 48 as indicated by the numeral 60 shown in FIG. 3A.

A nominal speed for movement of the positionable element 16 is stored in a first look-up table in the read only memory 34 included in the speed control circuit 32. Following movement of the positionable element 16 to the first or home position, the speed control circuit 32 accesses the first look-up table, reads the nominal speed information, and stores the nominal speed information in an address location in the random access memory included in the speed control circuit as indicated by the numerals 62, 64, and 66, respectively, shown in FIG. 3A.

Various address locations in the random access memory included in the speed control circuit 32 are addressed during the sequence when the first look-up table for the nominal speed drive signal is accessed. As will be described shortly, these locations in the random access memory are for storage of speed compensation values determined later in the initialization phase 48. However, since the random access memory is initialized at 0 upon commencement of the initialization phase 48, access of the random access memory locations has no effect on the nominal speed drive signal provided to the servomotor 12.

As indicated by the numeral 68 shown in FIG. 3A, the speed control circuit 32 then outputs the nominal speed information on the bus 36, whereupon the DAC 38 converts the digitally encoded representation of the nominal speed to an analog nominal speed drive signal. The analog nominal speed drive signal appears on the leads 40 and is routed through the driver control circuit 42 onto the leads 44, whereupon the servomotor drive circuit 46 provides a nominal speed drive signal to the servomotor 12 correlated to the nominal speed specified for movement of the positionable element 16 required during actual operation. Dependent upon the manufacturing tolerance variations for the positionable element 16, the operative condition of the servomechanism and/or positionable element, and environmental conditions, for example, the nominal speed drive signal provided to the servomotor 12 by the servomotor drive circuit 46 causes the positionable element to be moved at the nominal speed, or at a greater speed, or at a lesser speed.

The positionable element 16 is initially stepped in a forward direction from a first position to a second position and then is stepped in a reverse direction from the second position back to the first position as indicated by the numeral 70 shown in FIG. 3A. As the positionable element 16 is stepped in the forward direction, movement of the positionable element is evidenced by the output signal from the shaft encoder 22, which appears on the leads 26. The tachometer circuit 28 converts the output signal to a pulse train related to the actual speed of the positionable element 16 during the initialization phase 48 in response to the applied nominal speed drive signal.

The speed control circuit 32 initiates a timing sequence as indicated by the numeral 72 shown in FIG. 3A in response to the first pulse from the tachometer circuit 28, which appears on the lead 30. The timing sequence 72 comprises starting a timer in response to the first pulse which appears on the lead 30, counting pulses which appear on that lead until a predetermined number of pulses correlated to the distance between the first position and the second position are accumulated, and storing the time in an address location in the random access memory included in the speed control circuit 32 as indicated by the numerals 74, 76, and 78, respectively, shown in FIG. 3A.

Since the distance traversed by the positionable element 16 during movement between the first position and the second position is precisely indicated by the pulse train on the lead 30, the time stored by the speed control circuit 32 is a direct measure of the speed of the positionable element during movement between the first position and the second position. That is, knowing the distance over which the positionable element 16 has moved and the time required for the movement, the actual speed is merely a function of dividing the distance by the time. Consequently, the stored time is correlated to the actual speed of movement of the positionable element 16 during the initialization phase 48.

A series of such movements can be conducted in each direction in which the positionable element 16 can be moved as indicated by the numeral 80 shown in FIG. 3A. For example, if the positionable element 16 is a carriage, the carriage can be stepped three times by an identical amount, such as twelve incremental distances at 1/120 of an inch per increment in a forward or rightward direction, as well as in a reverse or leftward direction, and the individual times for movement in each direction can be added in order to provide total times required for the plurality of movements in the respective directions, which are stored in address locations in the random access memory included in the speed control circuit 32. Subsequently, the total times are divided by the number of repetitions in order to provide average times as indicated by the numeral 82 shown in FIG. 3A.

In the case where the positionable element 16 is a print wheel, the print wheel is moved one-half rotation in the forward or clockwise direction, which translates to a movement of ninety-six increments in the forward direction, and is subsequently moved a half rotation in the reverse or counterclockwise direction, which translates again to a movement of ninety-six increments. The timing sequence 72 comprises timing the angular rotation of the print wheel in the forward or clockwise direction, storing the time in an address location in the random access memory included in the speed control circuit 32, timing the angular rotation of the print wheel in the reverse or counterclockwise direction, and storing the time in another address location in the random access memory. In contradistinction to the carriage movement, accumulation of a time for more than one movement of the print wheel in each direction has not been found to be needed.

The times, which can be average times, for movement of the positionable element 16 between the first position and the second position in response to application of a nominal speed drive signal by the servomotor drive circuit 46 to the servomotor 12 are stored in address locations in the random access memory included in the speed control circuit 32 as indicated by the numeral 84 shown in FIG. 3A. This concludes the timing sequence 72 during the initialization phase 48.

The speed control circuit 32 next initiates a compensation sequence as indicated by the numeral 86 shown in FIG. 3B during which a second look-up table stored in the read only memory 34 is accessed as indicated by the numeral 88 shown in FIG. 3B. The times, which can be average times, stored in address locations in the random access memory included in the speed control circuit 32 during the timing sequence 72 (FIG. 3A) select speed compensation values from the second look-up table, and the speed compensation values are stored in address locations in the random access memory as indicated by the numerals 90 and 92, respectively, shown in FIG. 3B. The compensation sequence 86 is repeated for each of the times, which can be average times, stored during the timing sequence 72 (FIG. 3A).

In the case where the positionable element 16 is a carriage, for example, a speed compensation value is selected based on the average times related to movement in the rightward direction and stored in an address location in the random access memory included in the speed control circuit 32, and, similarly, a value of speed compensation is selected and stored for movement in the leftward direction. In the case where the positionable element 16 is a print wheel, a speed compensation value for clockwise rotation is selected and stored in an address location in the random access memory included in the speed control circuit 32, and a value of speed compensation for rotation in a counterclockwise direction is selected and stored in an address location in the random access memory.

The speed control circuit 32 preferably compares the time correlated to the speed of movement of the positionable element 16 in each direction during the timing sequence 72 (FIG. 3A) with a limit as indicated by the numeral 94 shown in FIG. 3B. If the stored time is greater than or equal to the limit, the maximum speed compensation value is selected as indicated by the numeral 96 shown in FIG. 3B. Storage of the speed compensation values in address locations in the random access memory included in the speed control circuit 32 as indicated by the numeral 92 shown in FIG. 3B completes the initialization phase 48.

Subsequently, when the positionable element 16 is moved during actual operation in response to a command signal, the speed control circuit 32 accesses the first look-up table for the nominal speed information as indicated by the numeral 98 shown in FIG. 3B. The nominal speed information is read and stored in an address location in the random access memory included in the speed control circuit 32 as indicated by the numerals 100 and 102, respectively, shown in FIG. 3B. The speed control circuit 32 then alters the nominal speed information in accordance with the speed compensation values stored in the random access memory during the compensation sequence 86 for movement in each direction as indicated by the numeral 104 shown in FIG. 3B. For example, the compensation value can comprise a preselected incremental or decremental digitally encoded value, such as plus or minus one, two, or three units of speed compensation. (If no speed compensation is required, a 0 value of speed compensation is added.)

In the case where the positionable element 16 is a carriage, if the actual carriage speed is too low, the nominal speed for movement in each direction is separately incremented by a fixed value (i.e., plus one, two, or three units); if the actual speed is too high, the nominal speed is decremented by a fixed value (i.e., minus one, two, or three units).

The constant values are combined with the respective nominal speeds during actual operation. Compensated speed drive signals determined by the speed control circuit 32 comprise a combination, that is, an additive combination, of the nominal speed information stored in the first look-up table and the compensation speed values obtained from the second look-up table, which are determined during the speed compensation sequence 86.

The digitally encoded representation of the compensated speed drive signal which appears on the bus 36 from the speed control circuit 32 is converted by the DAC 38 to an analog compensated speed drive signal. The driver control circuit 42 interfaces the analog compensated speed drive signal to the servomotor drive circuit 46, whereupon the compensated speed drive signal is provided to the servomotor 12 as indicated by the numeral 106 in FIG. 3B.

The ascertainment of the need for speed compensation and the determination of the amount of speed compensation required to conform the actual speed of operation to the specified speed of operation are preferably performed prior to actual operation rather than on a continuous basis during actual operation, for example, through feedback circuitry. Because the speed adjustment is performed asynchronously with actual operation, the complexity and cost of the speed normalization circuit 10 is minimized. Furthermore, speed normalization does not affect (i.e., decrease) throughput during actual operation.

As will now be apparent, automated positioning systems provided with speed normalization in accordance with the invention do not need to be fine tuned after manufacture for the purpose of adjusting for speed variations caused by tolerance variations throughout the manufacturing process evidenced by differences in speed, as well as speed differences attributable to changes in environmental conditions. Not only is factory adjustment eliminated, but frequent service calls are avoided.

While an embodiment for a speed normalization circuit has been described in order to make the invention understandable to those skilled in the art, it will be appreciated that modifications not mentioned will become apparent to those skilled in the art. It is to be clearly understood that the above description is by way of example and illustration only and is not to be taken by way of limitation. Accordingly, the spirit and scope of this invention are ascertainable only by reference to the appended claims.

What is claimed is:

1. A method for adjusting the operating speed of a positionable element movable among various positions, comprising the steps of:
   providing stored information correlated to a preselected nominal speed of movement for the positionable element during operation;
   providing stored information correlated to at least one speed compensation value;
   activating means for moving the positionable element;
   applying a predetermined drive signal to the moving means for moving the positionable element from a first position to a second position in response to activation of the moving means, the predetermined drive signal being dependent upon the stored information correlated to the preselected nominal speed;
   detecting the actual speed of the positionable element during movement from the first position to the second position in response to application of the predetermined drive signal to the moving means;
   converting the detected actual speed of the positionable element during movement from the first position to the second position to information correlated to the actual speed of the positionable element during movement from the first position to the second position;
   selecting information correlated to a speed compensation value dependent upon the information correlated to the actual speed of the positionable element during movement from the first position to the second position;
   storing the selected information correlated to the speed compensation value; and
   determining a compensated drive signal from the stored information correlated to the preselected nominal speed and the stored selected information correlated to the speed compensation value.

2. The method of claim 1 wherein the step of providing stored information correlated to a preselected nominal speed of movement for the positionable element during operation comprises providing a storage means having stored information correlated to a preselected nominal speed.

3. The method of claim 1 wherein the step of providing stored information correlated to at least one speed compensation value comprises providing a storage means having stored information correlated to at least one speed compensation value.

4. The method of claim 2 wherein the information correlated to a preselected nominal speed is contained in a look-up table stored in a read only memory.

5. The method of claim 3 wherein the information correlated to at least one speed compensation value is contained in a look-up table stored in a read only memory.

6. The method of claim 1 wherein the step of detecting the actual speed of the positionable element during movement from the first position to the second position in response to application of the predetermined drive signal to the moving means comprises sensing variations in the output signal produced by a shaft encoder and wherein the step of converting the detected actual speed of the positionable element during movement from the first position to the second position comprises accumulating a time for the movement of the positionable element from the first position to the second position as indicated by a predetermined number of variations in the shaft encoder output signal and wherein the step of selecting information correlated to a speed compensation value dependent upon the information correlated to the actual speed of the positionable element during movement from the first position to the second position comprises accessing a speed compensation value from the stored information correlated to at least one speed compensation value based on the accumulated time for the movement of the positionable element from the first position to the second position.

7. The method of claim 5 wherein the stored information correlated to at least one speed compensation value comprises the values zero, one, two, and three units contained in the look-up table and wherein the step of determining a compensated drive signal from the stored information correlated to the preselected nominal speed and the stored selected information correlated to the speed compensation value comprises incrementing the preselected nominal speed by the selected value from among the units one, two, and three, when the actual speed is too slow, and decrementing the preselected nominal speed by the selected value from among the units one, two, and three, when the actual speed is too fast.

8. The method of claim 6 wherein the information correlated to at least one speed compensation value is contained in a look-up table stored in a read only memory.

9. The method of claim 8 wherein the stored information correlated to at least one speed compensation value comprises the values zero, one, two, and three units contained in the look-up table and wherein the step of determining a compensated drive signal from the stored information correlated to the preselected nominal speed and the stored selected information correlated to the speed compensation value comprises incrementing the preselected nominal speed by the selected value from among the units one, two, and three, when the actual speed is too slow, and decrementing the preselected nominal speed by the selected value from among the units one, two, and three, when the actual speed is too fast.

10. The method of claim 1, further comprising:
applying a second predetermined drive signal to the moving means for moving the positionable element from the second position back to the first position, the second predetermined drive signal being dependent upon the stored information correlated to the preselected nominal speed;
detecting the actual speed of the positionable element during movement from the second position back to the first position in response to application of the second predetermined drive signal to the moving means;
converting the detected actual speed of the positionable element during movement from the second position back to the first position to information correlated to the actual speed of the positionable element during movement from the second position back to the first position;
selecting information correlated to a second speed compensation value dependent upon the information correlated to the actual speed of the positionable element during movement from the second position back to the first position;
storing the selected information correlated to the second speed compensation value; and
determining a second compensated drive signal from the stored information correlated to the preselected nominal speed and the stored selected information correlated to the second speed compensation value;
whereby a compensated drive signal is determined for movement of the positionable element in the direction from the first to the second position and a second compensated drive signal is determined for movement of the positionable element in the direction from the second to the first position.

11. The method of claim 6 wherein the step of applying the predetermined drive signal to the moving means for moving the positionable element from the first position to the second position is repeated a plurality of repetitions and wherein the step of converting the detected actual speed of the positionable element during movement from the first position to the second position comprises determining an average time for the movement of the positionable element from the first position to the second position for the plurality of repetitions and wherein the step of selecting information correlated to a speed compensation value dependent upon the information correlated to the actual speed of the positionable element during movement from the first position to the second position comprises accessing a speed compensation value from the stored information correlated to at least one speed compensation value based on the average time for the movement of the positionable element from the first position to the second position for the plurality of repetitions.

12. A method for adjusting the operating speed of a printing means movable among various print positions, comprising the steps of:
providing stored information correlated to a preselected nominal speed of movement for the printing means during operation;
providing stored information correlated to at least one speed compensation value;
activating a servomechanism for moving the printing means;
applying a predetermined drive signal to the servomechanism for moving the printing means a preset number of print positions from a first position to a second position in response to activation of the servomechanism without initiating printing, the predetermined drive signal being dependent upon the stored information correlated to the preselected nominal speed;
detecting the actual speed of the printing means during movement from the first position to the second position in response to application of the predetermined drive signal to the servomechanism;
converting the detected actual speed of the printing means during movement from the first position to the second position to information correlated to the actual speed of the printing means during movement from the first position to the second position;
selecting information correlated to a speed compensation value dependent upon the information correlated to the actual speed of the printing means during movement from the first position to the second position;
storing the selected information correlated to the speed compensation value; and
determining a compensated drive signal from the stored information correlated to the preselected nominal speed and the stored selected information correlated to the speed compensation value.

13. A method for adjusting the operating speed of a printing means movable among various print positions, comprising the steps of:
providing stored preselected nominal speed information in a first look-up table, the preselected nominal speed information being correlated to a specified speed of movement for the printing means during operation;
providing stored speed compensation information in a second look-up table;
activating a servomechanism for moving the printing means;
accessing the first look-up table for the preselected nominal speed information;
storing the preselected nominal speed information;
converting the preselected nominal speed information to a predetermined drive signal;
applying the predetermined drive signal to the servomechanism for moving the printing means a preset number of print positions from a first position to a second position in response to activation of the servomechanism without initiating printing;
detecting the actual speed of the printing means during movement from the first position to the second position in response to application of the predetermined drive signal to the servomechanism;
converting the detected actual speed of the printing means during movement from the first position to the second position to information correlated to the actual speed of the printing means during movement from the first position to the second position;
accessing the second look-up table for the speed compensation information;
selecting speed compensation information dependent upon the information correlated to the actual speed of the printing means during movement from the first position to the second position;
storing the selected speed compensation information;
determining compensated drive signal information from the stored preselected nominal speed information and the stored selected speed compensation information;

converting the compensated drive signal information to a printing operation drive signal; and applying the printing operation drive signal to the servomechanism during ensuing printing operation by means of the printing means.

14. Apparatus for adjusting the operating speed of a positionable element movable among various positions, comprising:

means for storing information correlated to a preselected nominal speed of movement for the positionable element during operation;

means for storing information correlated to at least one speed compensation value;

means for moving the positionable element;

means for applying a predetermined drive signal to the moving means for moving the positionable element from a first position to a second position in response to activation of the moving means, the predetermined drive signal being dependent upon the stored information correlated to the preselected nominal speed;

means for detecting the actual speed of the positionable element during movement from the first position to the second position in response to application of the predetermined drive signal to the moving means;

means for converting the detected actual speed of the positionable element during movement from the first position to the second position to information correlated to the actual speed of the positionable element during movement from the first position to the second position;

means for selecting information correlated to a speed compensation value dependent upon the information correlated to the actual speed of the positionable element during movement from the first position to the second position;

means for storing the selected information correlated to the speed compensation value; and means for determining a compensated drive signal from the stored information correlated to the preselected nominal speed and the stored selected information correlated to the speed compensation value.

15. The apparatus of claim 14 wherein the means for storing information correlated to a preselected nominal speed of movement for the positionable element during operation comprises a look-up table stored in a read only memory.

16. The apparatus of claim 14 wherein the means for storing information correlated to at least one speed compensation value comprises a look-up table stored in a read only memory.

17. The apparatus of claim 14 wherein the means for detecting the actual speed of the positionable element during movement from the first position to the second position in response to application of the predetermined drive signal to the moving means comprises means for sensing variations in the output signal produced by a shaft encoder and wherein the means for converting the detected actual speed of the positionable element during movement from the first position to the second position comprises a timing means for accumulating a time for the movement of the positionable element from the first position to the second position as indicated by a predetermined number of variations in the shaft encoder output signal and wherein the means for selecting information correlated to a speed compensation value dependent upon the information correlated to the actual speed of the positionable element during movement from the first position to the second position comprises means for accessing a speed compensation value from the stored information correlated to at least one speed compensation value based on the accumulated time for the movement of the positionable element from the first position to the second position.

18. The apparatus of claim 16 wherein the stored information correlated to at least one speed compensation value comprises the values zero, one, two, and three units contained in the look-up table and wherein the means for determining a compensated drive signal from the stored information correlated to the preselected nominal speed and the stored selected information correlated to the speed compensation value comprises means for incrementing the preselected nominal speed by the selected value from among the units one, two, and three, when the actual speed is too slow, and decrementing the preselected nominal speed by the selected value from among the units one, two, and three, when the actual speed is too fast.

19. The apparatus of claim 17 wherein the means for storing information correlated to at least one speed compensation value comprises a look-up table stored in a read only memory.

20. The apparatus of claim 19 wherein the stored information correlated to at least one speed compensation value comprises the values zero, one, two, and three units contained in the look-up table and wherein the means for determining a compensated drive signal from the stored information correlated to the preselected nominal speed and the stored selected information correlated to the speed compensation value comprises means for incrementing the preselected nominal speed by the selected value from among the units one, two, and three, when the actual speed is too slow, and decrementing the preselected nominal speed by the selected value from among the units one, two, and three, when the actual speed is too fast.

21. The apparatus of claim 14, further comprising:

means for applying a second predetermined drive signal to the moving means for moving the positionable element from the second position back to the first position, the second predetermined drive signal being dependent upon the stored information correlated to the preselected nominal speed;

means for detecting the actual speed of the positionable element during movement from the second position back to the first position in response to application of the second predetermined drive signal to the moving means;

means for converting the detected actual speed of the positionable element during movement from the second position back to the first position to information correlated to the actual speed of the positionable element during movement from the second position back to the first position;

means for selecting information correlated to a second speed compensation value dependent upon the information correlated to the actual speed of the positionable element during movement from the second position back to the first position;

means for storing the selected information correlated to the second speed compensation value; and means for determining a second compensated drive signal from the stored information correlated to the preselected nominal speed and the stored selected information correlated to the second speed compensation value;

thereby determining a compensated drive signal for movement of the positionable element in the direction from the first to the second position and a second compensated drive signal for movement of the positionable element in the direction from the second to the first position.

22. The apparatus of claim 17 wherein the means for applying the predetermined drive signal to the moving means for moving the positionable element from the first position to the second position applies the predetermined drive signal a plurality of repetitions and wherein the means for converting the detected actual speed of the positionable element during movement from the first position to the second position comprises means for determining an average time for the movement of the positionable element from the first position to the second position for the plurality of repetitions and wherein the means for selecting information correlated to a speed compensation value dependent upon the information correlated to the actual speed of the positionable element during movement from the first position to the second position comprises means for accessing a speed compensation value from the stored information correlated to at least one speed compensation value based on the average time for the movement of the positionable element from the first position to the second position for the plurality of repetitions.

23. Apparatus for adjusting the operating speed of a printing means movable among various print positions, comprising:

means for storing information correlated to a preselected nominal speed of movement for the printing means during operation;

means for storing information correlated to at least one speed compensation value;

means for activating a servomechanism for moving the printing means;

means for applying a predetermined drive signal to the servomechanism for moving the printing means a preset number of print positions from a first position to a second position in response to activation of the servomechanism without initiating printing, the predetermined drive signal being dependent upon the stored information correlated to the preselected nominal speed;

means for detecting the actual speed of the printing means during movement from the first position to the second position in response to application of the predetermined drive signal to the servomechanism;

means for converting the detected actual speed of the printing means during movement from the first position to the second position to information correlated to the actual speed of the printing means during movement from the first position to the second position;

means for selecting information correlated to a speed compensation value dependent upon the information correlated to the actual speed of the printing means during movement from the first position to the second position;

means for storing the selected information correlated to the speed compensation value; and means for determining a compensated drive signal from the stored information correlated to the preselected nominal speed and the stored selected information correlated to the speed compensation value.

24. Apparatus for adjusting the operating speed of a printing means movable among various print positions, comprising:

means for storing preselected nominal speed information in a first look-up table, the preselected nominal speed information being correlated to a specified speed of movement for the printing means during operation;

means for storing speed compensation information in a second look-up table;

means for activating a servomechanism for moving the printing means;

means for accessing the first look-up table for the preselected nominal speed information;

means for storing the preselected nominal speed information;

means for converting the preselected nominal speed information to a predetermined drive signal;

means for applying the predetermined drive signal to the servomechanism for moving the printing means a preset number of print positions from a first position to a second position in response to activation of the servomechanism without initiating printing;

means for detecting the actual speed of the printing means during movement from the first position to the second position in response to application of the predetermined drive signal to the servomechanism;

means for converting the detected actual speed of the printing means during movement from the first position to the second position to information correlated to the actual speed of the printing means during movement from the first position to the second position;

means for accessing the second look-up table for the speed compensation information;

means for selecting speed compensation information dependent upon the information correlated to the actual speed of the printing means during movement from the first position to the second position;

means for storing the selected speed compensation information;

means for determining compensated drive signal information from the stored preselected nominal speed information and the stored selected speed compensation information;

means for converting the compensated drive signal information to a printing operation drive signal; and means for applying the printing operation drive signal to the servomechanism during ensuing printing operation by means of the printing means.

* * * * *